(12) United States Patent
Feng

(10) Patent No.: US 11,188,180 B1
(45) Date of Patent: Nov. 30, 2021

(54) TOUCH PANEL AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventor: Xiaoliang Feng, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 405 days.

(21) Appl. No.: 16/471,783

(22) PCT Filed: Mar. 13, 2019

(86) PCT No.: PCT/CN2019/077928
§ 371 (c)(1),
(2) Date: Jun. 20, 2019

(87) PCT Pub. No.: WO2020/118934
PCT Pub. Date: Jun. 18, 2020

(30) Foreign Application Priority Data

Dec. 13, 2018 (CN) .......................... 201811525540.6

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04112* (2013.01)

(58) Field of Classification Search
CPC ................. G06F 3/0446; G06F 3/0412; G06F 2203/04112
See application file for complete search history.

(56) References Cited

U.S. PATENT DOCUMENTS

| | | | |
|---|---|---|---|
| 2008/0192160 A1 | 8/2008 | Yoshida | |
| 2014/0152916 A1* | 6/2014 | Nakamura | G06F 3/0445 349/12 |
| 2015/0083568 A1 | 3/2015 | Park et al. | |

FOREIGN PATENT DOCUMENTS

| | | |
|---|---|---|
| CN | 101246291 A | 8/2008 |
| CN | 102759999 A | 10/2012 |
| CN | 104183603 A | 12/2014 |
| CN | 107831937 A | 3/2018 |
| CN | 207216591 U | 4/2018 |

* cited by examiner

*Primary Examiner* — Peter D McLoone
(74) *Attorney, Agent, or Firm* — Hauptman Ham, LLP

(57) ABSTRACT

The present invention provides a touch panel and a display device. The touch panel includes multiple first electrode chains and multiple second electrode chains. Each of the first electrode chains includes multiple first electrodes electrically connected through bridging layers. Each of the first electrodes, the bridging layers, and the second electrode chains consists of mesh metal lines. Each of the first electrode includes a first mesh metal line defect portion, and each of the second electrode chain includes multiple second mesh metal line defect portions. The bridging layers are complementary to the first mesh metal line defect portions and the second mesh metal line defect portions.

17 Claims, 5 Drawing Sheets

TOUCH PANEL AND DISPLAY DEVICE

1. FIELD OF DISCLOSURE

The present invention relates to a field of display devices and in particular, to a touch panel and a display device.

2. DESCRIPTION OF RELATED ART

At present, touch panels generally include a carrier layer and a touch structure formed on the carrier layer, and touch positions are sensed by a capacitance change of the touch structure. With development of touch panels, metal mesh mutual-capacitive touch structures are increasingly used in production due to their excellent performance. However, the metal mesh mutual-capacitive touch structures are often affected by bridging point connection manners. Conditions in bridging point connection, such as poor linking or stacking position deviation, may cause bridging point connection lines to appear widened, which results in optical defects or even local moiré patterns.

Therefore, conventional techniques have drawbacks and are in urgent need of improvement.

SUMMARY

The present invention provides a touch panel and a display device, which can improve stacking position deviation between a bridging layer and an electrode pattern layer, thereby avoiding optical defects or local moiré patterns.

In order to solve the above-mentioned problem, the present invention provides a touch panel, comprising:

a touch region, the touch region comprising a plurality of first electrode chains and a plurality of second electrode chains which are intersected with and electrically insulated from each other; and a wiring region and a bonding region, the wiring region comprising a plurality of touch control lines, one end of each of the touch control lines being connected to one of the first electrode chains or one of the second electrode chains, the other end of each of the touch control lines being extended to the bonding region through the wiring region;

wherein a plurality of first electrodes are spaced apart at intersections of the first electrode chains and the second electrode chains, and each adjacent two of the first electrodes in the first electrode chain are electrically connected to each other through a bridging layer, wherein each of the first electrodes, the bridging layers, and the second electrode chains consists of a plurality of mesh metal lines, and wherein each first electrode comprises a first mesh metal line defect portion, each second electrode chain comprises a plurality of second mesh metal line defect portions, and each bridging layer comprises a third mesh metal line defect portion; and wherein each first mesh metal line defect portion is arranged corresponding to and is complementary to a vertical projection of each bridging layer projected onto a corresponding one of the first electrodes, and each second mesh metal line defect portion is arranged corresponding to and is complementary to a vertical projection of each bridging layer projected onto a corresponding one of the second electrode chains.

In the touch panel of the present invention, the mesh metal lines comprise a plurality of first metal lines and a plurality of second metal lines intersected with each other, each of the second electrode chains comprises a plurality of second electrodes, and each adjacent two of the second electrodes are electrically connected through corresponding ones of the second metal lines.

In the touch panel of the present invention, the first mesh metal line defect portions and the third mesh metal line defect portions both exclude the second metal lines, and the second mesh metal line defect portions exclude the first metal lines.

In the touch panel of the present invention, each second mesh metal line defect portion and each third mesh metal line defect portion are both disposed at a corresponding one of intersections of the bridging layers and the second electrode chains.

In the touch panel of the present invention, the first mesh metal line defect portions and the second mesh metal line defect portions both exclude the first metal lines, and the third mesh metal line defect portions exclude the second metal lines.

In the touch panel of the present invention, each second mesh metal line defect portion is disposed at a corresponding one of intersections of the bridging layers and the second electrode chains, each third mesh metal line defect portion is disposed at a corresponding one of intersections of the bridging layers and the second electrode chains, and two ends of each bridging layer are disposed corresponding to corresponding two of the first mesh metal line defect portions.

In the touch panel of the present invention, each bridging layer is connected to each of adjacent two of the first electrodes through a via hole at a bridging connection position, and each bridging layer and each second electrode chain are electrically insulated from each other.

In the touch panel of the present invention, each bridging connection position is at a corresponding one of intersections of the first metal lines and the second metal lines.

Accordingly, the present invention provides a display device, comprising a plurality of pixel units and the touch panel mentioned above, wherein each first electrode chain and each second electrode chain are disposed in a gap between adjacent two of the pixel units.

In order to solve the above-mentioned problem, the present invention provides a touch panel, comprising:

a touch region, the touch region comprising a plurality of first electrode chains and a plurality of second electrode chains which are intersected with and electrically insulated from each other; and a plurality of first electrodes spaced apart from each other at intersections of the first electrode chains and the second electrode chains, each adjacent two of the first electrodes in a corresponding one of the first electrode chains are electrically connected to each other through a bridging layer;

wherein each of the first electrodes, the bridging layers, and the second electrode chains consists of a plurality of mesh metal lines; each of the first electrodes comprises a first mesh metal line defect portion, each of the second electrode chains comprises a plurality of second mesh metal line defect portions, and each bridging layer comprises a third mesh metal line defect portion;

wherein each first mesh metal line defect portion is arranged corresponding to and is complementary to a vertical projection of each bridging layer projected onto a corresponding one of the first electrodes; each second mesh metal line defect portion is arranged corresponding to and is complementary to a vertical projection of each bridging layer projected onto a corresponding one of the second electrode chains.

In the touch panel of the present invention, the mesh metal lines comprise a plurality of first metal lines and a plurality of second metal lines intersected with each other, each of the second electrode chains comprises a plurality of second electrodes, and each adjacent two of the second electrodes are electrically connected through each second metal line.

In the touch panel of the present invention, the first mesh metal line defect portions and the third mesh metal line defect portions both exclude the second metal lines, and the second mesh metal line defect portions exclude the first metal lines.

In the touch panel of the present invention, each second mesh metal line defect portion and each third mesh metal line defect portion are both disposed at a corresponding one of intersections of the bridging layers and the second electrode chains.

In the touch panel of the present invention, the first mesh metal line defect portions and the second mesh metal line defect portions both exclude the first metal lines, and the third mesh metal line defect portions exclude the second metal lines.

In the touch panel of the present invention, each second mesh metal line defect portion is disposed at a corresponding one of intersections of the bridging layers and the second electrode chains, each third mesh metal line defect portion is disposed at a corresponding one of intersections of the bridging layers and the second electrode chains, and two ends of each bridging layer are disposed corresponding to corresponding two of the first mesh metal line defect portions.

In the touch panel of the present invention, each bridging layer is connected to each of adjacent two of the first electrodes through a via hole at a bridging connection position, and each bridging layer and each second electrode chain are electrically insulated from each other.

In the touch panel of the present invention, each bridging connection position is disposed at a corresponding one of intersections of the first metal lines and the second metal lines.

Compared with the existing touch panels, advantages of the touch panel and the display device provided by the present invention are as follows: the bridging layer cooperates with the first electrode chain and the second electrode chain, thereby reducing overlapping metal lines in directions vertical to the first electrode chains and the second electrode chains, such that the bridging layer is connected to the first electrode chain through the via holes at the bridging connection positions only. Excluding the bridging connection positions, and at positions corresponding to the bridging layer, the first electrode chains and the second electrode chains don't have metal lines arranged in same directions of the metal lines of the bridging layer. This avoids widening of the metal lines caused by alignment deviation between upper and lower layers, thus improving stacking position deviation. In addition, connection through the via holes can be realized easily with high precision in manufacturing processes.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without an inventive work or paying the premise.

DETAILED DESCRIPTION OF EMBODIMENTS

Embodiments of the present disclosure are described in detail with reference to the accompanying drawings as follows. Directional terms such as up/down, front/rear, right/left, inside/outside, and the like may be used for the purpose of enhancing a reader's understanding about the accompanying drawings, but are not intended to be limiting. Specifically, the terminologies in the embodiments of the present disclosure are merely for the purpose of describing certain embodiments, but not intended to limit the scope of the invention. The same reference numbers are used throughout the drawings to refer to the same or similar parts.

The present invention is directed to solving an existing problem in conventional touch panels. The problem is that the metal mesh-like bridging layer and the electrode layer may have a stacking position deviation, which causes connection lines of the bridging layer to appear to be widened, thereby causing optical defects and even local moiré patterns. The present invention can solve this problem.

Figure 1:
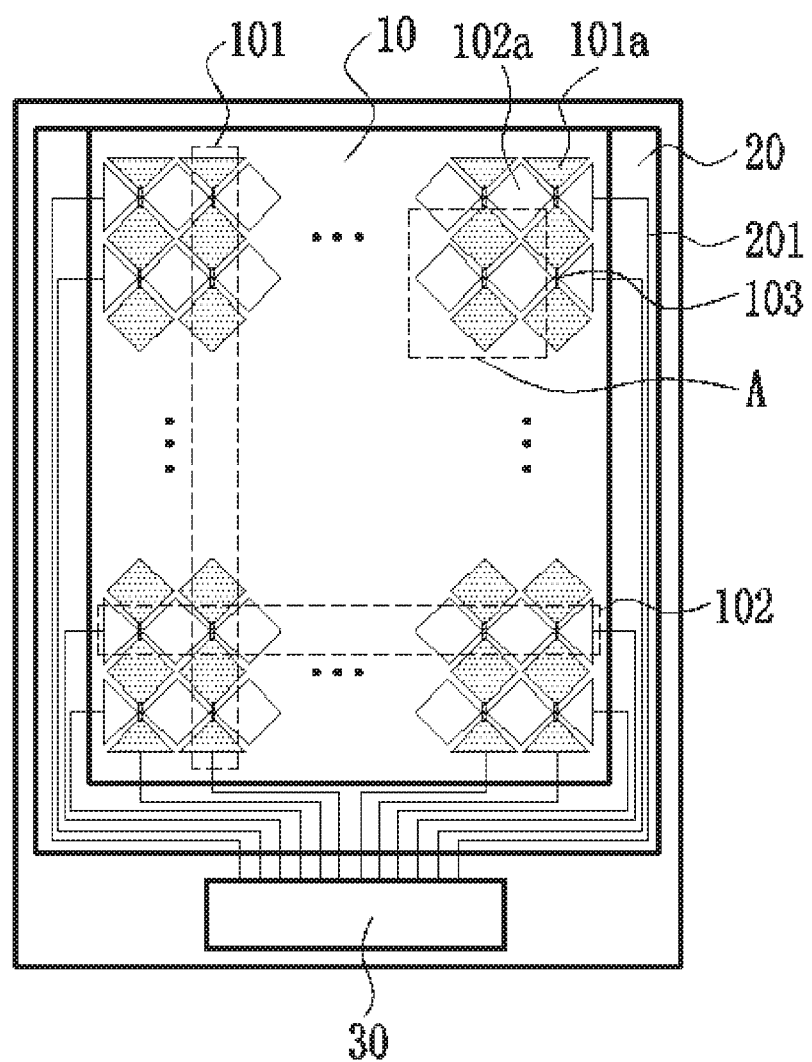
FIG. 1 is a schematic structural view illustrating a touch panel of the present invention.

Please refer to FIG. 1, which is a schematic structural view illustrating a touch panel according to one embodiment of the present invention. The touch panel comprises a touch region 10, a wiring region 20, and a bonding region 30 disposed at one side of the touch region 10. The touch region 10 comprises a plurality of first electrode chains 101 and a plurality of second electrode chains 102 which are intersected with and electrically insulated from each other. A plurality of first electrodes 101a are spaced apart at intersections of the first electrode chains 101 and the second electrode chains 102. Each second electrode chain 102 comprises a plurality of second electrodes 102a connected through a metal at a layer the same as a layer of the second electrode chains 102. The first electrodes 101a and the second electrodes 102a are produced at the same layer. Each adjacent two of the first electrodes 101a in the first electrode chain 101 are electrically connected to each other through a bridging layer 103.

According to one embodiment of the present invention, each first electrode 101a is a touch electrode, and each second electrode 102a is a sensing electrode.

The wiring region 20 comprises a plurality of touch control lines 201. One end of each of the touch control lines 201 is connected to one of the first electrode chains 101 or one of the second electrode chains 102, the other end of each of the touch control lines 201 is extended to the bonding region 30 through the wiring region 20.

Figure 2:
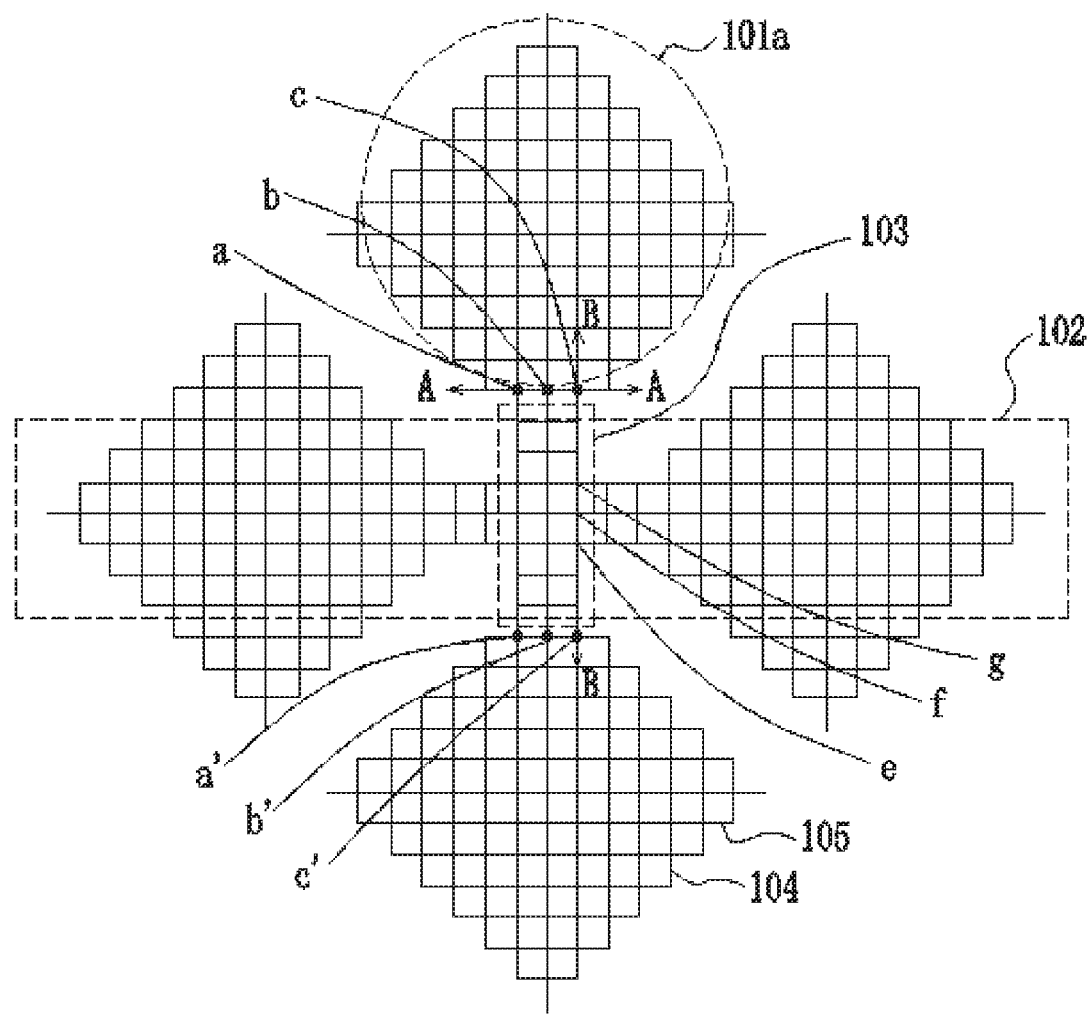
FIG. 2 is an enlarged view of an area A in FIG. 1.

Please refer to FIG. 2, which is an enlarged view of area A in FIG. 1. Each of the first electrodes 101a, the bridging layers 103, and the second electrode chains 102 consists of a plurality of mesh metal lines. The mesh metal lines comprise a plurality of first metal lines 104 (i.e., vertical metal lines in the drawing) and a plurality of second metal lines 105 (i.e., horizontal metal lines in the drawing) intersected with each other. Each adjacent two of the second electrodes 102a in each second electrode chain 102 are electrically connected through corresponding ones of the second metal lines 105. Each bridging layer 103 is connected to each of adjacent two of the first electrodes 101a through via holes at bridging connection positions a, b, c, a', b', c', and each bridging layer 103 and each second electrode chain 102 are electrically insulated from each other.

According to one embodiment of the present invention, the bridging connection positions a, b, c, a', b', c' are disposed at the intersections of the first metal lines 104 and the second metal lines 105. The bridging connection positions a, b, c, a', b', c' are disposed at edges of the first electrodes 101a or inside the first electrodes 101a.

Figure 3:
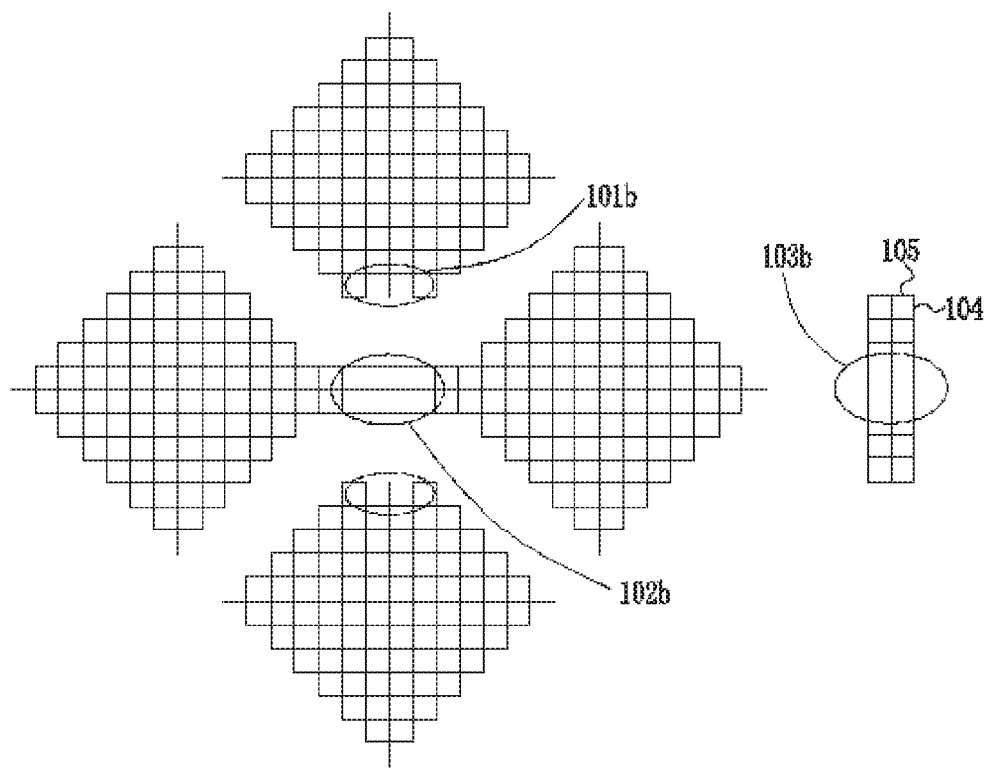
FIG. 3 is a schematic view showing a bridging layer, first electrodes, and second electrodes, presented in an independent manner from other, according to one embodiment of the present invention.

Referring to FIGS. 2 and 3, FIG. 3 shows the bridging layer, the first electrodes, and the second electrodes, presented in an independent manner from each other, according to the present embodiment. In the drawing, each first electrode 101a comprises a first mesh metal line defect portion 101b, each second electrode chain 102 comprises a plurality of second mesh metal line defect portions 102b, and each bridging layer 103 comprises a third mesh metal line defect portion 103b. The first mesh metal line defect portions 101b and the third mesh metal line defect portions 103b both exclude the second metal lines 105, and the second mesh metal line defect portions 102b exclude the first metal lines 104. Each second mesh metal line defect portion 102b and each third mesh metal line defect portion 103b are both disposed at a corresponding one of intersections of the bridging layers 103 and the second electrode chains 102.

Two ends of each bridging layer 103 are connected to adjacent two of the first electrodes 101a through the respective via holes at the bridging connection positions a, b, c, a', b', c'. The first metal lines 104 in each bridging layer 103 are aligned with the first metal lines 104 of adjacent two first electrodes 101a and are connected to the adjacent two first electrodes 101a at the bridging connection positions a, b, c, a', b', c'.

A length of each second metal line 105 in the bridging layer 103 is equal to a length of the second metal line 105 missing at the first mesh metal line defect portion 101b. In other words, each first mesh metal line defect portion 101b is arranged corresponding to and is complementary to a vertical projection of each bridging layer 103 projected onto a corresponding one of the first electrodes 101a. Each second mesh metal line defect portion 102b is arranged corresponding to and is complementary to a vertical projection of each bridging layer 103 projected onto a corresponding one of the second electrode chains 102.

As shown in FIG. 2, the mesh metal lines of the bridging layers 103 are complementary to the mesh metal lines of the first electrodes 101a and the second electrode chains 102. That is to say, in an area of the vertical projection of each bridging layer 103, the mesh metal lines of the first electrodes 101a and the mesh metal lines of the bridging layers 103 are not in a same direction; in an area of the vertical projection of each bridging layer 103, the mesh metal lines of the second electrode chains 102 and the mesh metal lines of the bridging layer 103 are not in a same direction. As shown in the drawing, the vertical projection of each bridging layer 103 projected onto a corresponding one of the first electrodes 101a fills the second metal line 105 missing in the first mesh metal line defect portion 101b. The vertical projection of each bridging layer 103 projected onto a corresponding one of the second electrode chains 102 fills the first metal line 104 missing in the first mesh metal line defect portion 102b. This way, the mesh metal lines of the bridging layers 103 and the second electrode chains 102 only intersect, and there is no overlap; the mesh metal lines of the bridging layers 103 and the mesh metal lines of the first electrodes 101a are connected only at the bridging connection positions without overlap. Therefore, the configuration avoids widening of the metal lines due to alignment deviation between upper and lower layers, thereby improving stacking position deviation.

Figure 4:
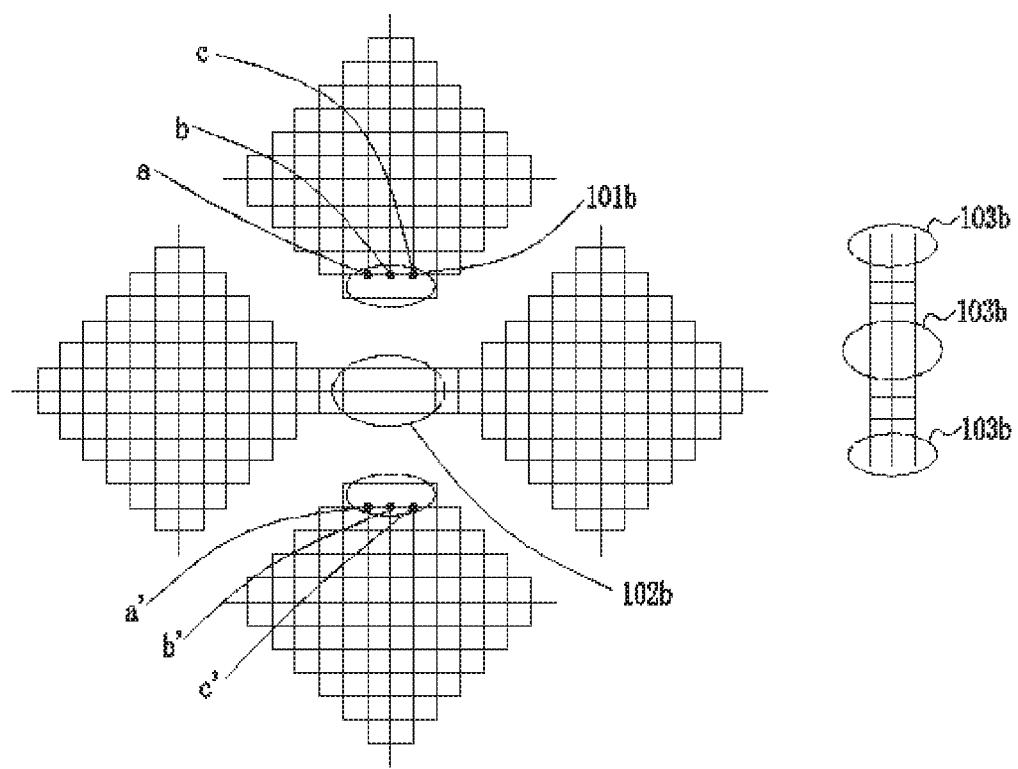
FIG. 4 is another schematic view showing the bridging layer, the first electrodes, and the second electrodes, presented in an independent manner from each other, according to one embodiment of the present invention.

Please refer to FIG. 4, which is another schematic view of the present embodiment, illustrating the bridging layers, the first electrodes, and the second electrodes, presented in a manner independent from each other. FIG. 4 is different from FIG. 3 in that the first mesh metal line defect portion 101b of each first electrode 101a lacks the first metal line 104; each second mesh metal line defect portion 102b of each second electrode chain 102 also lacks the first metal line 104; the third mesh metal line defect portion 103b of the bridging layer 103 lacks the second metal line 105. The second mesh metal line defect portions 102b are located at intersections of the bridging layers 103 and the second electrode chains 102. The third mesh metal line defect portions 103b are located at intersections of the bridging layers 103 and the second electrode chains 102. Two ends of each bridging layer 103 are arranged corresponding to corresponding two of the first mesh metal line defect portions 101b. The first metal lines 104 in the bridging layers 103 are connected to the first electrodes 101a through bridging connection positions a, b, c, a', b', c', wherein the bridging connection positions a, b, c, a', b', c' are located inside the first electrodes 101a.

Figure 5:
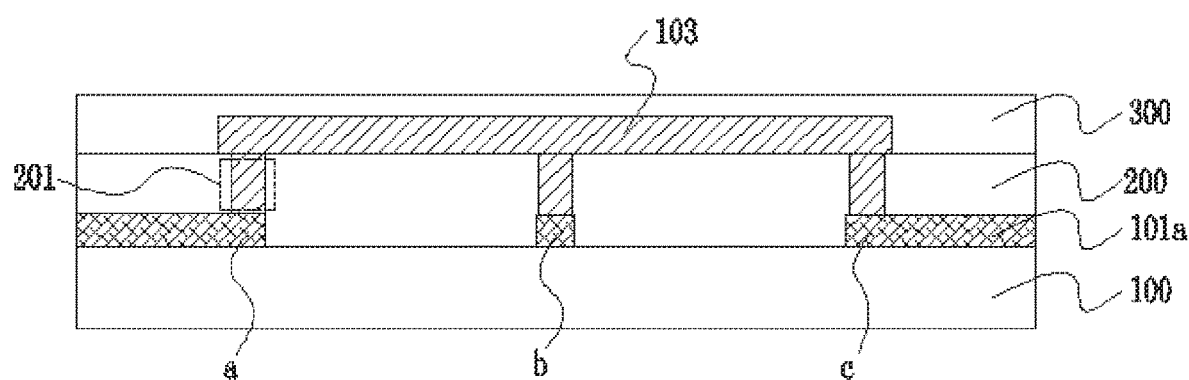
FIG. 5 is a cross-sectional view taken along line A-A of FIG. 2.

Please refer to FIG. 5, which is a cross-sectional view taken along line A-A of FIG. 2. The drawing shows a substrate 100, a first insulating layer 200, and a second insulating layer 300, and the drawing shows that the bridging layer 103 is connected to the first electrode 101a through the via holes 201 at the bridging connection positions a, b, c.

Figure 6:
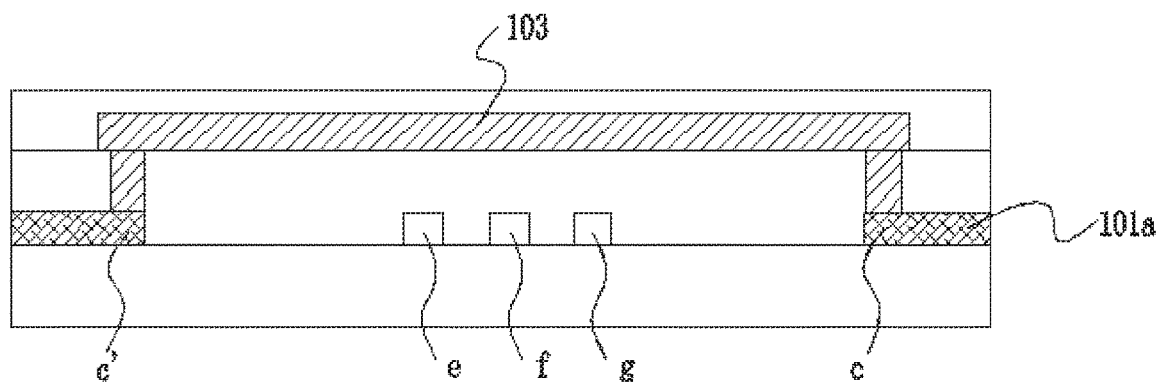
FIG. 6 is a cross-sectional view taken along line B-B of FIG. 2.

Please refer to FIG. 6, which is a cross-sectional view taken along line B-B of FIG. 2. As shown in the drawing, the bridging layer 103 is connected to the first electrodes 101a through the via holes at the bridging connection positions c', c. The bridging layer 103 is electrically insulated from the second electrode chain at intersections e, f, g of the second electrode chain and the bridging layer 103.

The present invention provides a display device. The display device comprises a plurality of pixel units and the touch panel mentioned above. The display device can be an add-on touch type or an embedded touch type. The first electrode chains and the second electrode chains are disposed at a gap between each two adjacent pixel units.

In the touch panel and the display device provided by the present invention, the bridging layers cooperates with the first electrode chains and the second electrode chains, thereby reducing overlapping metal lines in directions vertical to the first electrode chains and the second electrode chains, such that the bridging layers are connected to the first electrode chains through the via holes at the bridging connection positions only. Excluding the bridging connection positions and at positions corresponding to the bridging layers, the metal lines of the first electrode chains and the metal lines of the second electrode chains are not in same directions of the metal lines of the bridging layer. This avoids widening of the metal lines caused by alignment deviation between upper and lower layers, thus improving stacking position deviation. In addition, connection through the via holes can be realized easily with high precision in the manufacturing process.

It is to be understood that the above descriptions are merely the preferable embodiments of the present invention and are not intended to limit the scope of the present invention. Equivalent changes and modifications made in the spirit of the present invention are regarded as falling within the scope of the present invention.

What is claimed is:

1. A touch panel, comprising:
   a touch region, the touch region comprising a plurality of first electrode chains and a plurality of second electrode chains which are intersected with and electrically insulated from each other; and
   a wiring region and a bonding region, the wiring region comprising a plurality of touch control lines, one end of each of the touch control lines being connected to one of the first electrode chains or one of the second electrode chains, the other end of each of the touch control lines being extended to the bonding region through the wiring region;
   wherein a plurality of first electrodes are spaced apart at intersections of the first electrode chains and the second electrode chains, and each adjacent two of the first electrodes in the first electrode chain are electrically connected to each other through a bridging layer, wherein each of the first electrodes, the bridging layers, and the second electrode chains consists of a plurality of mesh metal lines, and wherein each first electrode comprises a first mesh metal line defect portion, each second electrode chain comprises a plurality of second mesh metal line defect portions, and each bridging layer comprises a third mesh metal line defect portion; and
   wherein each first mesh metal line defect portion is arranged corresponding to and is complementary to a vertical projection of each bridging layer projected onto a corresponding one of the first electrodes, and each second mesh metal line defect portion is arranged corresponding to and is complementary to a vertical projection of each bridging layer projected onto a corresponding one of the second electrode chains.

2. The touch panel according to claim 1, wherein the mesh metal lines comprise a plurality of first metal lines and a plurality of second metal lines intersected with each other, each of the second electrode chains comprises a plurality of second electrodes, and each adjacent two of the second electrodes are electrically connected through corresponding ones of the second metal lines.

3. The touch panel according to claim 2, wherein the first mesh metal line defect portions and the third mesh metal line defect portions both exclude the second metal lines, and the second mesh metal line defect portions exclude the first metal lines.

4. The touch panel according to claim 3, wherein each second mesh metal line defect portion and each third mesh metal line defect portion are both disposed at a corresponding one of intersections of the bridging layers and the second electrode chains.

5. The touch panel according to claim 2, wherein the first mesh metal line defect portions and the second mesh metal line defect portions both exclude the first metal lines, and the third mesh metal line defect portions exclude the second metal lines.

6. The touch panel according to claim 5, wherein each second mesh metal line defect portion is disposed at a corresponding one of intersections of the bridging layers and the second electrode chains, each third mesh metal line defect portion is disposed at a corresponding one of intersections of the bridging layers and the second electrode chains, and two ends of each bridging layer are disposed corresponding to corresponding two of the first mesh metal line defect portions.

7. The touch panel according to claim 2, wherein each bridging layer is connected to each of adjacent two of the first electrodes through a via hole at a bridging connection position, and each bridging layer and each second electrode chain are electrically insulated from each other.

8. The touch panel according to claim 7, wherein the bridging connection positions are at the intersections of the first metal lines and the second metal lines.

9. A display device, comprising a plurality of pixel units and the touch panel of claim 1, wherein each first electrode chain and each second electrode chain are disposed in a gap between adjacent two of the pixel units.

10. A touch panel, comprising:
    a touch region, the touch region comprising a plurality of first electrode chains and a plurality of second electrode chains which are intersected with and electrically insulated from each other; and
    a plurality of first electrodes spaced apart from each other at intersections of the first electrode chains and the second electrode chains, each adjacent two of the first electrodes in a corresponding one of the first electrode chains are electrically connected to each other through a bridging layer;
    wherein each of the first electrodes, the bridging layers, and the second electrode chains consists of a plurality of mesh metal lines; each of the first electrodes comprises a first mesh metal line defect portion, each of the second electrode chains comprises a plurality of second mesh metal line defect portions, and each bridging layer comprises a third mesh metal line defect portion;
    wherein each first mesh metal line defect portion is arranged corresponding to and is complementary to a vertical projection of each bridging layer projected onto a corresponding one of the first electrodes; each second mesh metal line defect portion is arranged corresponding to and is complementary to a vertical projection of each bridging layer projected onto a corresponding one of the second electrode chains.

11. The touch panel according to claim 10, wherein the mesh metal lines comprise a plurality of first metal lines and a plurality of second metal lines intersected with each other, each of the second electrode chains comprises a plurality of second electrodes, and each adjacent two of the second electrodes are electrically connected through corresponding ones of the second metal lines.

12. The touch panel according to claim 11, the first mesh metal line defect portions and the third mesh metal line defect portions both exclude the second metal lines, and the second mesh metal line defect portions exclude the first metal lines.

13. The touch panel according to claim 12, wherein each second mesh metal line defect portion and each third mesh metal line defect portion are both disposed at a corresponding one of intersections of the bridging layers and the second electrode chains.

14. The touch panel according to claim 11, wherein the first mesh metal line defect portions and the second mesh metal line defect portions both exclude the first metal lines, and the third mesh metal line defect portions exclude the second metal lines.

15. The touch panel according to claim 14, wherein each second mesh metal line defect portion is disposed at a corresponding one of intersections of the bridging layers and the second electrode chains, each third mesh metal line defect portion is disposed at a corresponding one of intersections of the bridging layers and the second electrode chains, and two ends of each bridging layer are disposed corresponding to corresponding two of the first mesh metal line defect portions.

16. The touch panel according to claim 11, wherein each bridging layer is connected to each of adjacent two of the first electrodes through a via hole at a bridging connection position, and each bridging layer and each second electrode chain are electrically insulated from each other.

17. The touch panel according to claim 16, wherein each bridging connection position is disposed at a corresponding one of the intersections of the first metal lines and the second metal lines.

* * * * *